July 19, 1955   W. D. HOWELL   2,713,264
WATER GAUGE TANK UNIT
Filed Oct. 17, 1951
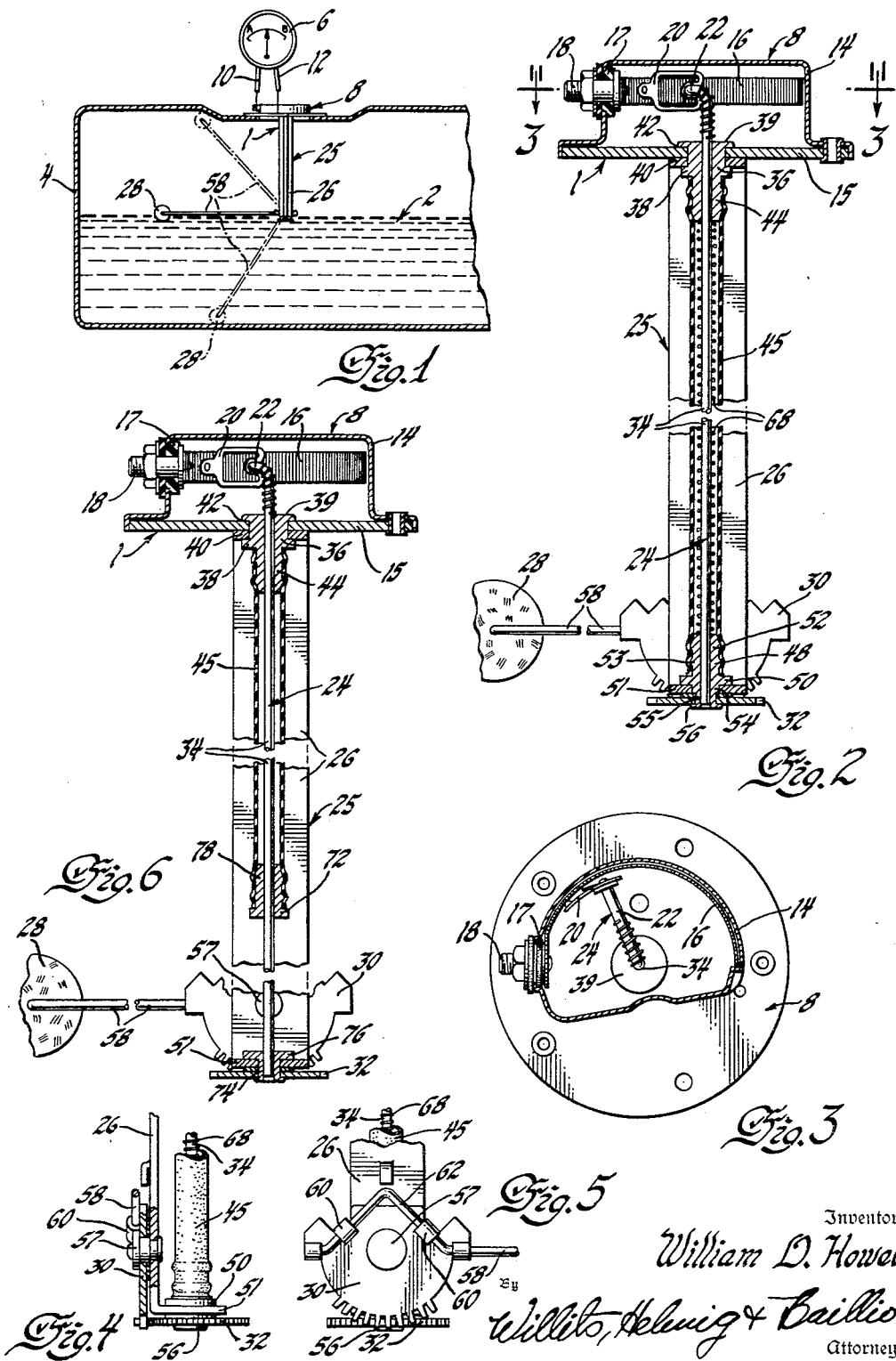
Inventor
William D. Howell
By Willits, Helwig & Baillio
Attorneys United States Patent Office 2,713,264
Patented July 19, 1955

2,713,264

WATER GAUGE TANK UNIT

William D. Howell, Flint, Mich., assignor to General Motors Corporation, Detroit, Mich., a corporation of Delaware Application October 17, 1951, Serial No. 251,769

4 Claims. (Cl. 73—317)

The present invention relates to gauges for measuring the liquid content of tanks and more particularly to the type of liquid level gauge having electrical means associated therewith operable by a float to control the liquid level indications on a meter.

In the type of liquid level gauges employing an electrical transmitter, it is necessary in order to insure accuracy in the operation thereof to prevent moisture from coming into contact therewith. It is extremely difficult, however, to provide a liquid-tight joint in cases where the operating means for the electrical transmitter passes through a wall of the tank and into the liquid therein. This is due to the fact that some clearance must be provided between the operating parts thus providing a space through which liquid may pass. The liquid is thereby carried upwardly into the electrical transmitter as a result of capillary action or other causes such as pressure within the tank. Since the electrical equipment is inherently of a very delicate nature, any liquid that comes into contact therewith might cause a short circuit therein or corrosion of the parts which will obviously cause it to become inaccurate or even totally inoperative. Various attempts have been made to eliminate leakage between the torque operating rods employed in apparatus of this character and the supporting bushings therefor, such as the provision of various forms of packing material and precision machined bearings, but such means have not proven to be entirely satisfactory. Not only is considerable friction generally developed by this type of joint which impairs the accuracy of the associated gauges but deterioration thereof results from wear and aging.

It, therefore, is an object of the present invention to provide in liquid level gauges, novel sealing means which effectively prevent moisture from being carried to the sensitive parts thereof by the associated operating means.

Another object is to provide a flexible seal for a joint between two relatively rotatable members.

A further object is to provide a liquid-tight seal for apparatus of the stated character which is so constructed as to enable free movement of the operating parts.

A still further object is to provide a gauge for measuring liquid levels that is simple in structure, economical in manufacture and at the same time is reliable and durable in operation.

These and other objects and features of the invention will become more apparent as the description of the invention progresses.

Of the drawings:

Fig. 1 is a sectional elevational view of a tank showing the liquid level gauge embodying the present invention.

Fig. 2 is a sectional elevational view of the electrical transmitting portion of a gauge mounted on the liquid tank and the operating portion thereof extending into said tank.

Fig. 3 is a sectional plan view of the electrical transmitting device taken substantially along line 3—3 of Fig. 2.

Fig. 4 is a fragmentary elevational view of the lower end of the operating portion of the gauge showing the seal secured thereto.

Fig. 5 is a fragmentary elevational view taken at substantially right angles to that of Fig. 4, and Fig. 6 is a sectional elevational view similar to Fig. 2 showing a slightly modified construction.

Referring to the drawings in more detail, the numeral 1 represents generally the liquid level gauge embodying the present invention. The liquid 2 to be measured is contained within a tank 4 of any desired shape and construction. The volume of this tank is indicated on the face of an electrical meter or receiving unit 6 that can be mounted in any convenient location such as on an instrument panel (not shown). The indications on meter 6 are transmitted thereto by a transmitting unit 8 mounted on the top of the tank 4 through conductors 10 and 12. The meter 6 may be of any suitable construction such as an ohmmeter type of construction. The transmitter unit 8 consists of a cover or casing 14 secured to a mounting plate 15 in any suitable manner such as by rivets. The cover and plate are in turn attached by any suitable fastening means to the top of the tank. To facilitate servicing the fastening may be of the removable variety such as a threaded bolt and nut. A resistance element 16 is fastened to the inside of casing 14 by any suitable insulating means 17. A bolt 18 is secured to one end of the resistance element 16 and projects through the cover 14. One end of conductor 10 is attached to bolt 18 while one end of the conductor 12 is connected to ground. The resistance of the element 16 is varied by moving a sliding contact 20 across the inner face thereof. Contact 20 is resiliently attached to the end of an arm 22 provided at the upper end of a torque rod 24. Thus as the rod 24 rotates the contact 20 will be correspondingly moved so as to vary the resistance of element 16.

The tank unit 25 of gauge 1 which in the present embodiment is suspended from the top of the tank 4 includes the torque rod 24, a bracket 26 for supporting said rod, a float 28 and gears 30 and 32. The torque rod 24 is substantially L-shaped and contains an elongated vertical shank 34 which terminates at its upper end in arm 22 which is bent at right angles thereto. Arm 22 as previously described supports the sliding contact 20 for the variable resistance 16. The upper end of the shank 34 of rod 24 is journalled in a bushing 36 rigidly secured to the mounting plate 15 which is fastened to the top of the tank 4. Bushing 36 has an annular shoulder 38 provided intermediate its ends for supporting bracket 26. As shown in Fig. 2 the upper portion 39 of bushing 36 extends through an opening provided in the top cross member 40 of bracket 26 and also through an opening provided in mounting plate 15. After insertion of bushing 36 through the openings in cross member 40 and plate 15, the upper end is peened or turned over as shown at 42 thereby effectively securing the bracket to mounting plate 15. Since it is essential that a liquid-tight joint be provided about bushing 36 and plate 15, said joint may be further sealed by soldering. The portion 44 of bushing 36 disposed beneath shoulder 38 receives the upper end of a sealing tube 45, annular ribs being provided on portion 44 to prevent the tube from slipping therefrom. The lower end of the shank 34 on rod 24 is secured to a bushing 48 of substantially the same shape as the upper bushing 36. Shank 34 may be press fitted in the bore of bushing 48 or otherwise secured thereto such as by soldering to provide a liquid tight joint therebetween. A reduced portion 52 extends upwardly from flange 50 for receiving the lower end of sealing tube 45 and like the portion 44 of bushing 36 has annular ribs 53 thereon to retain the said tube thereon. Bushing 48 has a reduced portion 54 depending from flange 50 which is journalled in an opening provided in the foot 51 of bracket 26. A flange 50 is provided intermediate the ends of bushing 48 which rotatably rests on the foot portion 51 of the bracket 26. A further reduced portion 55 of bushing 48 extends through an opening in gear 32 and is secured thereto in any suitable manner. The lowermost end of portion 55 is peened over as shown at 56. Thus gear 32, bushing 48 and rod 24 are secured together for simultaneous movement. The gear 30 is in the form of a quadrant and meshes with gear 32. Gear 30 is rotatably mounted on a stud 57 secured to the bracket 26 in any suitable manner. Quadrant gear 30 is connected to float 28 by a rod 58. Thus as the level of the liquid in tank 4 changes the float actuates gear 30 causing rotation of rod 24. To prevent the rod 58 from rotating about its own axis, an elbow 62 is provided thereon which lies flat against the face of the quadrant 30. Ears 60 struck out from gear 30 are bent above rod 58 to secure the latter to said gear. The other end of rod 58 is secured by any suitable means to the float 28. Float 28 may be constructed of any desired material such as cork and it may comprise a hollow metal ball.

As the level of the liquid 2 rises and falls it will carry the float 28 with it as shown in Fig. 1. When the float is moved in a vertical direction the quadrant 30 will rotate about the stud 57 causing the gear 32 and thereby the rod 24 to rotate. As the rod rotates the sliding contact 20 will move across the resistance element 16 which in turn controls the meter 6 causing the latter to thereby indicate the liquid level in tank 4.

In order to prevent the liquid in tank 4 from leaking into the apparatus and being carried to resistance element 16 through the passage between the torque rod 24 and the bushing 36, a pliable tubular seal 45 is provided. The tube 45 is flexible in construction and may be made of any suitable liquid-proof material such as rubber and tightly engages the ribbed portions 44 and 52 of bushing 36 and 48 respectively, as previously described. By virtue of the snug fit between tube 45 and bushings 36 and 48 and the ribbed construction of said bushings the rod 24 is effectively sealed against leakage from tank 4. The outside surface of the tube 45 is subjected to the pressure of the liquid 2 in addition to atmospheric pressure while the inside is subjected to only atmospheric pressure. As a result there is a tendency for the long flexible tube 45 to collapse and thus interfere with the free rotation of the rod 24. To prevent this a long spiral spring 68 is placed around the rod 24 and inside of the tube 45 and extends between bushings 36 and 48. Accordingly even though tube 45 should tend to collapse spring 68 will protect rod 24 from the action thereof.

It therefore is apparent that the electrical control elements are effectively protected from moisture leakage and as a result efficient operation of the gauge is assured.

Fig. 6 shows a gauge of a somewhat modified construction which is particularly adapted for use in installations employing unusually long torque or operating rods.

As shown in Fig. 6 the upper bushing 36 is similar to that shown in Figs. 1 and 2. The lower bushing however has been replaced by an extended flanged collar 72 which is spaced some distance from the lower end of bracket 26 and is secured to rod 24 in such a manner as to provide a liquid tight joint therebetween. The lower end of rod 24 is secured to a bushing 74 having a flange 76 thereon which rests on the foot 51 of bracket 26. Bushing 74 is journalled in an opening provided in foot 51 and the lower end thereof is secured to a gear 32 which meshes with a quadrant gear 30 connected to float 28. All of said elements have the same general construction as that previously described. In this construction also the reduced portion 44 of bushing 36 and the reduced portion 78 of collar 72 are provided with annular ribs to prevent the upper and lower ends of tube 45 from slipping therefrom. Thus in this construction also the flexible tube tightly engages bushing 36 and collar 72 and consequently leakage of liquid therebetween is effectively prevented. Inasmuch as the joint between rod 24 and collar 72 is also sealed this construction like that previously described effectively protects the sensitive electrical apparatus from the moisture in tank 4. The tube 45 of this construction might be relatively short and therefore collapsing thereof due to differential pressure is not so likely and therefore no coil protective spring is shown. However, a spring such as coil spring 68 may be inserted between tube 45 and rod 24 and other suitable means may also be employed in this construction also if it is so desired.

It will be apparent to anyone skilled in the art that the invention may be embodied in numerous other specific forms without departing from the true spirit or essential attributes thereof. While the seal has been shown in connection with a liquid gauge, it is apparent that it may be used in other cases as well wherein the parts comprise a moving member passing through a stationary one and it is desired to seal the joint therebetween against either a liquid or gas leakage. It therefore is to be understood that it is not intended to limit the invention to the specific embodiment disclosed but only by the scope of the claims which follow.

What is claimed is:

1. A liquid level gauge for use in a liquid container having a plurality of walls, said gauge comprising a bracket, said bracket being adapted to be disposed inside of said container substantially normal to one of the walls, the opposite ends of said bracket being laterally bent to form flanges remote from each other, one of said flanges abutting said wall and having an opening therein registering with a similar opening in said wall, an upper bearing member disposed in said registering openings for securing said first flange to said wall, a rod rotatably disposed in said upper bearing member, said rod having the inner end thereof rotatably supported by said second flange and the outer end thereof projecting from said container, actuating means supported by said bracket and coupled to said rod for positioning said rod responsive to the level of the liquid in said container, said upper bearing member having a tubular extension substantially concentric with said rod, a tubular member secured to said rod for rotation therewith, and a fluid proof flexible sleeve surrounding said rod in spaced relation, said sleeve having an inside diameter larger than said rod but less than the outside diameter of said tubular member and said tubular extension, one end of said sleeve being expanded and positioned on said tubular extension so as to tightly grip said extension, the other end of said sleeve being expanded and positioned on said tubular member so as to tightly grip said tubular member and thereby prevent moisture from coming into contact with said rod.

2. In a liquid container having a plurality of walls, a liquid level gauge comprising the combination of a bracket disposed inside of said container, the opposite ends of said bracket being laterally bent to form flanges remote from each other, one of said flanges abutting said wall and having an opening therein registering with a similar opening in said wall, an upper bearing member disposed in said registering openings for securing said first flange to said wall, a rod rotatably disposed in said upper bearing member, a lower bearing member secured to the inner end of said rod for rotation therewith, said lower bearing member being supported by said second flange, said upper bearing member having a tubular extension thereon disposed concentrically about said rod, actuating means supported by said bracket and coupled to said rod for positioning said rod responsive to the level of the liquid in said container, said lower bearing member having a tubular extension thereon disposed substantially concentrically with said rod, and a fluid proof flexible sleeve surrounding said rod, said sleeve having an inside diameter larger than said rod but less than the outside diameters of said tubular extensions, the ends of said sleeve being expanded and positioned on said tubular extensions so as to tightly grip said extensions and thereby prevent moisture from coming into contact with said rod.

3. A liquid level gauge for use in a liquid container having a plurality of walls, said gauge comprising a bracket, said bracket being adapted to be disposed inside of said container substantially normal to one of the walls, the opposite ends of said bracket being laterally bent to form flanges remote from each other, one of said flanges abutting said wall and having an opening therein registering with a similar opening in said wall, an upper bearing member disposed in said registering openings for securing said first flange to said wall, a rod rotatably disposed in said upper bearing member, said rod having the inner end thereof rotatably supported by said second flange and the outer end thereof projecting from said container, actuating means supported by said bracket and coupled to said rod for positioning said rod responsive to the level of the liquid in said container, said upper bearing member having a tubular extension substantially concentric with said rod, a tubular member secured to said rod for rotation therewith, a fluid proof flexible sleeve surrounding said rod in spaced relation, said sleeve having an inside diameter larger than said rod but less than the outside diameter of said tubular member and said tubular extension, one end of said sleeve being expanded and positioned on said tubular extension so as to tightly grip said extension, the other end of said sleeve being expanded and positioned on said tubular member so as to tightly grip said tubular member and thereby prevent moisture from coming into contact with said rod, and a spring disposed between said sleeve and said rod.

4. In a liquid container having a plurality of walls, a liquid level gauge comprising the combination of a bracket disposed inside of said container, the opposite ends of said bracket being laterally bent to form flanges remote from each other, one of said flanges abutting said wall and having an opening therein registering with a similar opening in said wall, an upper bearing member disposed in said registering openings for securing said first flange to said wall, a rod rotatably disposed in said upper bearing member, a lower bearing member secured to the inner end of said rod for rotation therewith, said lower bearing member being supported by said second flange, said upper bearing member having a tubular extension thereon disposed concentrically about said rod, actuating means supported by said bracket and coupled to said rod for positioning said rod responsive to the level of the liquid in said container, said lower bearing member having a tubular extension thereon disposed substantially concentrically with said rod, and a fluid proof flexible sleeve surrounding said rod, said sleeve having an inside diameter larger than said rod but less than the outside diameters of said tubular extensions, the ends of said sleeve being expanded and positioned on said tubular extensions so as to tightly grip said extensions and thereby prevent moisture from coming into contact with said rod and a spring disposed between said sleeve and said rod.

References Cited in the file of this patent

UNITED STATES PATENTS

| | | |
|---|---|---|
| 160,703 | Painter | Mar. 9, 1875 |
| 429,611 | Facer | June 10, 1890 |
| 1,257,929 | Ritz-Woller | Feb. 26, 1918 |
| 1,481,322 | Kellum | Jan. 22, 1924 |
| 1,807,139 | Volodimirov | May 26, 1931 |